US009912157B2

(12) United States Patent
Yano et al.

(10) Patent No.: US 9,912,157 B2
(45) Date of Patent: Mar. 6, 2018

(54) ENERGY MANAGEMENT SYSTEM AND ENERGY MANAGEMENT METHOD

(71) Applicant: NEC Corporation, Tokyo (JP)

(72) Inventors: Hitoshi Yano, Tokyo (JP); Ryo Hashimoto, Tokyo (JP); Yuma Iwasaki, Tokyo (JP); Eisuke Saneyoshi, Tokyo (JP); Hisato Sakuma, Tokyo (JP); Koji Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 14/769,032

(22) PCT Filed: Dec. 17, 2013

(86) PCT No.: PCT/JP2013/083707
§ 371 (c)(1),
(2) Date: Aug. 19, 2015

(87) PCT Pub. No.: WO2014/136353
PCT Pub. Date: Sep. 12, 2014

(65) Prior Publication Data
US 2016/0006246 A1    Jan. 7, 2016

(30) Foreign Application Priority Data

Mar. 4, 2013   (JP) ................... 2013-041665

(51) Int. Cl.
*H02J 3/46*    (2006.01)
*H02J 3/32*    (2006.01)
(Continued)

(52) U.S. Cl.
CPC ............... *H02J 3/32* (2013.01); *H02J 7/007* (2013.01); *H02J 13/0062* (2013.01);
(Continued)

(58) Field of Classification Search
CPC .......... H02J 3/32; H02J 7/007; H02J 13/0072; H02J 13/0062
(Continued)

(56) References Cited

U.S. PATENT DOCUMENTS

2007/0035290 A1* 2/2007 Schweigert ......... H02M 5/4585
324/142
2013/0184882 A1 7/2013 Momose et al.
2015/0295423 A1 10/2015 Murayama et al.

FOREIGN PATENT DOCUMENTS

EP           2375528 A2    10/2011
JP        2001-103665 A     4/2001
(Continued)

OTHER PUBLICATIONS

Extended European Search Report issued in corresponding European Patent Application No. 13877246.2, dated Sep. 15, 2016, 6 pages.
(Continued)

*Primary Examiner* — Thomas Skibinski
(74) *Attorney, Agent, or Firm* — Wilmer Cutler Pickering Hale and Dorr LLP

(57) ABSTRACT

An energy management system and an energy management method enable an improvement of the balance between power supply and demand. A storage battery (52) is connected to a power line (42) that transmits outside power. A storage battery controller (54) receives a control signal indicating a reduced use period during which the consumption of the outside power by a consumer apparatus (43) connected to the power line (42) is to be reduced, acquires an index value that has a correlation with the demand for outside power, and on the basis of the control signal and the index value, adjusts the amount of charging/discharging of the storage battery (52).

9 Claims, 14 Drawing Sheets

(51) Int. Cl.
*H02J 13/00* (2006.01)
*H02J 7/00* (2006.01)

(52) U.S. Cl.
CPC ......... *H02J 13/0072* (2013.01); *Y02E 60/722* (2013.01); *Y02E 60/7838* (2013.01); *Y02E 60/7846* (2013.01); *Y04S 10/14* (2013.01); *Y04S 40/124* (2013.01); *Y04S 40/125* (2013.01)

(58) Field of Classification Search
USPC .............................. 307/18–22, 24, 29, 31, 66
See application file for complete search history.

(56) References Cited

FOREIGN PATENT DOCUMENTS

| JP | 2008-306832 A | 12/2008 |
|----|---------------|---------|
| JP | 2010-166636 A | 7/2010 |
| JP | 2011-061964 A | 3/2011 |
| JP | 2012-080681 A | 4/2012 |
| JP | 4920123 B1 | 4/2012 |
| JP | 2012-254015 A | 12/2012 |
| JP | 2013-015235 A | 1/2013 |
| JP | 2013-031283 A | 2/2013 |
| JP | 2013-038470 A | 2/2013 |
| WO | WO-2008/058284 A2 | 5/2008 |
| WO | WO-2012/014731 A1 | 2/2012 |
| WO | WO-2012/017937 A1 | 2/2012 |
| WO | WO-2012/131869 A1 | 10/2012 |

OTHER PUBLICATIONS

Japanese Office Action issued in corresponding Japanese Patent Application No. 2015-504137, dated Nov. 1, 2016, 5 pages.
International Search Report, Corresponding to PCT/JP2013/083707, dated Feb. 10, 2014, 2 pages.

* cited by examiner

ENERGY MANAGEMENT SYSTEM AND ENERGY MANAGEMENT METHOD

CROSS-REFERENCE TO RELATED APPLICATIONS

The present application is a national stage application of International Application No. PCT/JP2013/083707 entitled "Energy Management System and Energy Management Method" filed on Dec. 17, 2013, which claims the benefit of priority from Japanese Patent Application No. JP2013-041665, filed on Mar. 4, 2013, the disclosures of which are incorporated herein in their entirety by reference thereto.

TECHNICAL FIELD

The present invention relates to a technology for controlling the charging/discharging of a storage battery.

BACKGROUND ART

In an electric system that supplies commercial electric power to consumers, a tight balance between electric power supply and demand in which the requirements for commercial power come close to exceeding supply generally occurs several times a year. As a result, power companies have taken countermeasures such as providing reserve power plants to relieve the tight balance between electric power supply and demand. However, this type of countermeasure entails the problem of the causes an increasing the cost of operating the electric power system resulting from the high cost of plant maintenance simply in order to relieve the tight balance between electric power supply and demand that occurs only several times a year.

In this regard, a technology known as "demand response" has been receiving attention due to its ability to relieve the tight balance between electric power supply and demand at a low cost. Demand response is a technology for avoiding a tight balance between electric power supply and demand at a low cost by communicating to consumers, in time periods in which the occurrence of tight balance between the electric power supply and demand can be anticipated, a demand response signal such as an electricity price signal indicating the imposition of peak time period charges (Critical Peak Pricing: CPP) in which electricity charges are higher than normal or a power-saving command indicating a demand to conserve power to cause consumers to change the temperature settings of air conditioners or the brightness of lighting apparatuses and thus lower the power consumption of electrical apparatuses. With demand response, a situation in which the tight balance between the supply of electric power and demand can be relieved without using reserve power plants, and thus the predicament of a tight balance between the electric power supply and demand can be relieved at low cost, and the operating costs of the electric power system can consequently be reduced.

In recent years low-cost high-capacity storage batteries have been introduced, as exemplified by lithium-ion storage batteries, and with this development, high-capacity storage batteries are beginning to be used in residences. Because lithium-ion batteries are being applied to electric vehicles in particular, even lower costs due to mass production can be expected with the popularization of electric vehicles, with the result that the popularization of lithium batteries in households is expected to advance.

A high-capacity storage battery in a residence is typically used for storing electric power generated by a power plant such as a photovoltaic power generator, used as an auxiliary power supply during a commercial power outage, or used for economizing electricity charges. In such cases, the storage battery is controlled so as to undergo charging by commercial electric power or by electric power that is generated by power generation equipment such as a photovoltaic power generator and at other times is controlled to discharge electricity. For example, the storage battery is controlled so as to be charged during the transmission of commercial power and to be discharged during power outages, to be charged during periods in which electricity charges are low in a time-of-use rate system, and to be discharged during periods in which electricity charges are high (refer to Patent Document 1).

The reverse power flow of electric power that is discharged from a storage battery to the electric power system is currently not allowed, but in the future when this reverse power flow is permitted and the reverse-flow electric power is purchased by an electric power company, it is expected that the spread of high-capacity storage batteries to residences will increase.

LITERATURE OF THE PRIOR ART

Patent Documents

Patent Document 1: Japanese Patent No. 4920123

SUMMARY OF THE INVENTION

Problem to be Solved by the Invention

In the demand response described above, the reduction of power consumption of electrical equipment such as air conditioners or illumination apparatuses was necessary to mitigate the tight balance between the supply of electric power and demand. However, because electrical equipment such as air conditioners or illumination apparatuses are devices for maintaining the comfort of the environment in which people live, the reduction of the power consumption of this electrical equipment frequently results in a loss of comfort such as an increase in room temperature or the darkening of room interiors. Consumers who wish to maintain comfort therefore often either do not use demand response or stop using demand response. As a result, problems persist with demand response regarding the stable operation of the electric power system.

On the other hand, if the above-described technology for controlling the charging/discharging of a high-capacity storage battery is applied to demand response so that a storage battery is charged during periods in which demand for commercial power is low and the storage battery is discharged during periods in which the demand for commercial power is high, the apparent demand for commercial power can be reduced, and as a result, the situation in which the tight balance between the supply of electric power and demand can be controlled without changing the temperature settings of air conditioners or changing the brightness of illumination apparatuses. Accordingly, no loss of comfort occurs, failure to use demand response or the interruption of demand response can be alleviated, and stable operation of the electric power system becomes possible.

However, when high-capacity storage batteries become adopted by high number of consumers and the above-described technology for controlling the charging/discharging of storage batteries is applied to demand response, there is a potential for the occurrence of a problem in which discharging of multiple storage batteries that are installed in consumer households will commence all at once at the starting time of the period in which the demand for commercial power is high, with the result that the demand for commercial power will change precipitously.

The above problem is next described more specifically using FIGS. 13 and 14.

FIG. 13 shows electricity charges by time period that takes into consideration peak time-of-use charges. In FIG. 13, electricity charges are set to rise in time periods in which the demand for commercial power increases, the electricity charges in the time period from 12:00 until 22:00 being the highest peak time-of-use charges.

FIG. 14 shows the result of simulations in which the changes in demand for commercial power are calculated for cases in which the charging/discharging of storage batteries that are installed in each of a plurality of consumer households is controlled according to demand response signals.

In FIG. 14, the simulation results are shown for cases in which the maximum output, which is the total value of the maximum amount of discharged electric power that can be discharged in each storage battery, and the total capacity, which is the total value of the capacity of each storage battery, are: (maximum output/total capacity)=(1600 kW/4800 kWh); (2400 kW/7200 kWh); and (4800 kW/14400 kWh). In addition, the amount of commercial power that can be supplied is assumed to be approximately 60,000,000 kW, and the change in demand for commercial power in a case in which demand response is not taken into consideration is shown as demand curve 91.

In the above-described situation, when the price for selling electric power discharged from a storage battery is assumed to be the same price as the electricity charges shown in FIG. 13 and the charging/discharging of each storage battery is controlled according to demand response so as to maximize the consumer's profit, the demand for commercial power changes according to the total capacity and maximum output of the storage batteries as shown by apparent demand curves 92-94, as shown in FIG. 14.

When the above-described control is implemented, charging is carried out in each storage battery in the period from midnight until dawn during which the electricity charges are cheap, and discharging is carried out in the period from noon until night during which electricity charges are high. In this case, electricity charges are set higher for periods during which demand for commercial power is higher, and charging of the storage battery is therefore carried out in periods during which the demand for commercial power is low and discharging of the storage battery is carried out in periods during which the demand for commercial power is high. Accordingly, the demand for commercial power is reduced, and a tight balance between the supply of electric power and demand can be prevented.

Nevertheless, the increased popularization of storage batteries will result in an increase in the proportion of the amount of charging/discharging of storage batteries with respect to demand for commercial power, and as a result, when storage batteries are discharged all at once in response to a large requirement for power, the apparent demand for commercial power will change precipitously as in the case of the lower part of FIG. 14 ((maximum output/total capacity)=(4800 kW/14400 kWh)), the apparent demand for commercial power will not be reduced, and the balance between supply and demand of commercial power will be even more unstable.

The present invention was realized in view of the above-described problem and has as an object the provision of an energy management system and energy management method that can improve the balance between supply and demand for electric power.

Means for Solving the Problem

The energy management system according to the present invention includes: a storage battery that is connected to a power line that transmits external electric power; and a control unit that receives a control signal that indicates reduced use periods in which the amount of external electric power that is consumed by a load that is connected to the power line is to be reduced, and further, that acquires an index value that correlates with demand for the external electric power, and that adjusts the amount of charging/discharging that is to be charged or discharged in the storage battery on the basis of the control signal and the index value.

The energy management method according to the present invention includes steps of:

receiving a control signal that indicates a reduced use period in which the amount of power consumption of outside electric power by a load that is connected to a power line that transmits the outside electric power is to be suppressed;

acquiring an index value that has a correlation with demand for the outside electric power; and on the basis of the control signal and the index value, adjusting the amount of charging/discharging of electric power that is charged or discharged in a storage battery that is connected to the power line.

Effect of the Invention

The present invention enables an improvement of the balance between supply and demand of electric power.

MODE FOR CARRYING OUT THE INVENTION

Exemplary embodiments of the present invention are next described with reference to the accompanying drawings. In the following explanation, components having identical functions are given the same reference numbers, and redundant explanation of these components is omitted.

Figure 1:
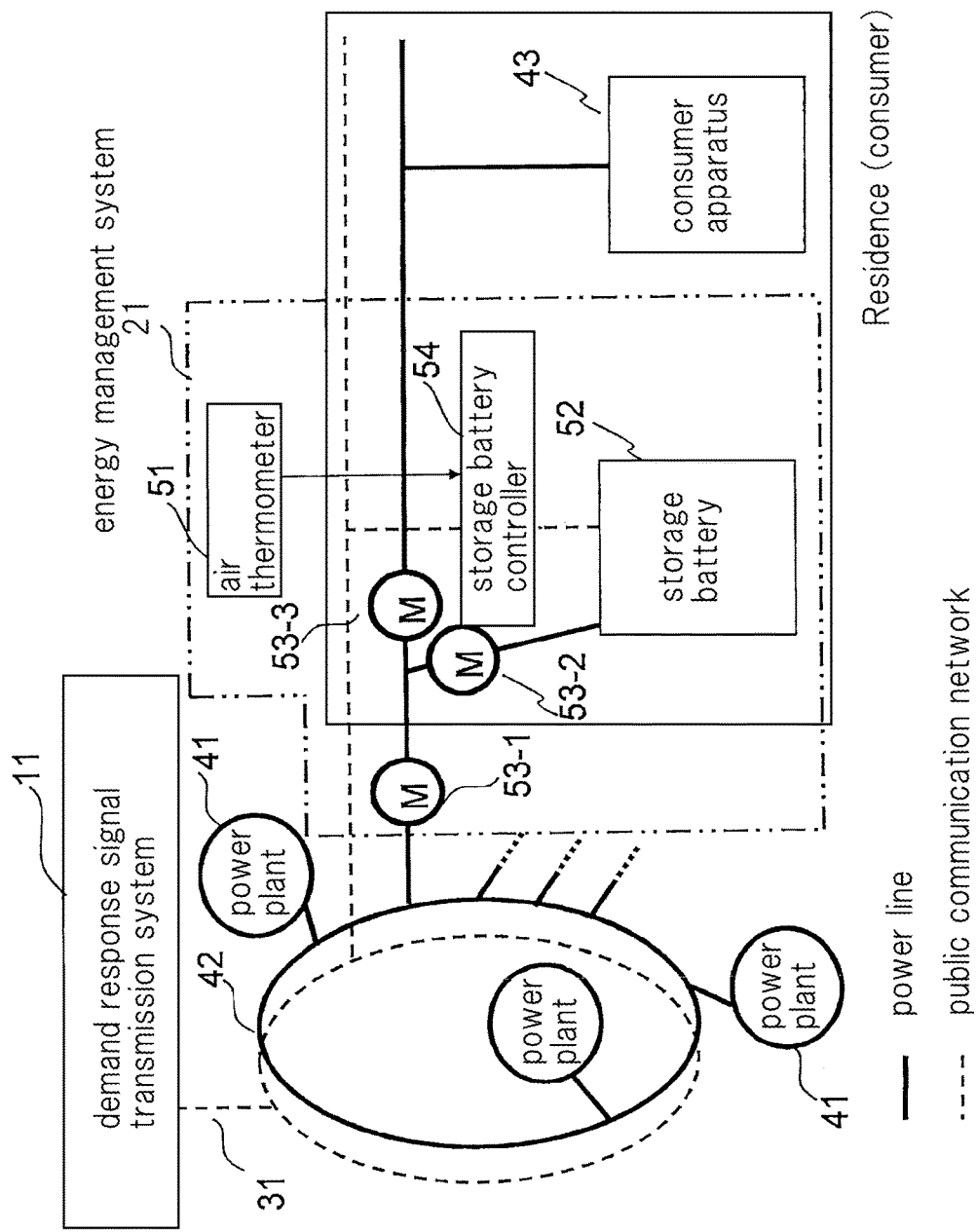
FIG. 1 shows an example of a demand response system of the first exemplary embodiment of the present invention.

FIG. 1 shows the demand response system of the first exemplary embodiment of the present invention. In FIG. 1, the demand response system includes demand response signal transmission system 11 and energy management system 21. Demand response signal transmission system 11 and energy management system 21 are mutually connected so as to enable communication by way of public communication network 31 (thick lines).

Energy management system 21 is used by a consumer who is supplied with electric power that is generated in power plant 41. In addition, the consumer has consumer apparatus 43 that is connected to power line 42 (broken lines) that transmits electric power that has been generated at power plant 41 as external electric power. Consumer apparatus 43 is a load that consumes electric power that is transmitted through power line 42, and for example, is an electric apparatus such as an air conditioner, a heat-pump water heater, or a refrigerator. Although only one consumer apparatus 43 is shown in FIG. 1, consumer apparatus 43 may actually be a plurality of apparatuses.

Demand response signal transmission system 11 transmits a demand response signal, which is a control signal indicating a reduced use period, in which the amount of consumption of outside electric power by consumer apparatus 43 is controlled, to energy management system 21 by way of public communication network 31. A reduced use period is a period in which a tight balance between the supply of electric power and demand is anticipated. In addition, a reduced use period may change according to the day or the season.

Energy management system 21 includes air thermometer 51, storage battery 52, watt-hour meter 53, and storage battery controller 54.

Air thermometer 51 is a measurement device that measures the air temperature as an index value that correlates with the demand for electric power, which is the demand for external electric power. In the present exemplary embodiment, air thermometer 51 is assumed to be installed outdoors to measure the outside air temperature that is the temperature outdoors.

Figure 2:
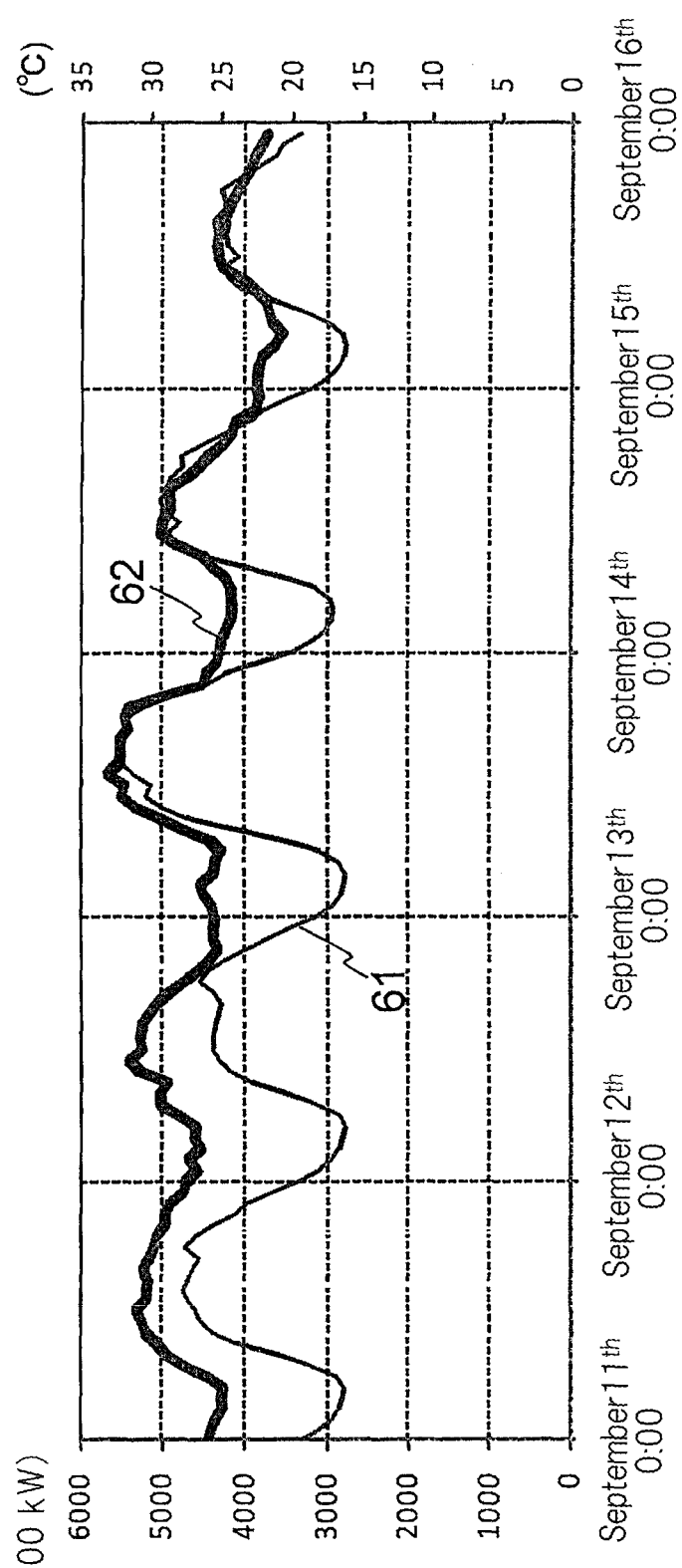
FIG. 2 is a view for describing the correlation between demand for electric power and temperature.

FIG. 2 is a view for describing the correlation between the demand for electric power and the outside air temperature. FIG. 2 shows demand curve 61 (thin line), which represents change in the demand for electric power, and air temperature curve 62 (thick line), which represents the change in the outside air temperature. In addition, demand curve 61 is created based on the demand for electric power in September 2010 that was actually provided by the Tokyo Electric Power Company (see http://www.tepco.co.jp/forecast/html/images/juyo-2010.csv), and air temperature curve 62 is created based on the air temperature of September 2010 of Tokyo that was actually provided by the Japan Meteorological Agency (see http://www.data.jma.go.jp/obd/stats/etrn/index.php).

As shown in FIG. 2, there is a substantially positive correlation between the demand for electric power and the outside air temperature, and when the peaks of the outside air temperature are high, the peaks for demand for electric power are also high. This phenomenon is believed to occur because, during the summer, the amount of power consumption by air conditioners increases for the cooling operation of air conditioners when the outside air temperature is high. During the winter, the amount of power consumption of heaters is believed to increase as the outside air temperature drops, and the demand for electric power therefore typically rises as the outside air temperature falls.

Returning to the explanation of FIG. 1, storage battery 52 is connected to power line 42, and performs charging/discharging of power line 42. The amount of charging/discharging that is carried out by storage battery 52 is adjusted by storage battery controller 54 as will later be described. Storage battery 52 is, for example, a lithium-ion battery.

Watt-hour meter 53 measures the electric energy that is the value of electric power that is transmitted on power line 42. In FIG. 1, a plurality of watt-hour meters 53 is assumed. More specifically, watt-hour meters 53 include watt-hour meter 53-1 that measures the electric energy that is supplied to and received from a consumer, watt-hour meter 53-2 that measures the amount of charging/discharging of storage battery 52, and watt-hour meter 53-3 that measures the electric energy that is supplied to consumer apparatuses 43.

Storage battery controller 54 is a control unit that controls energy management system 21.

Storage battery controller 54 receives demand response signals from demand response signal transmission system 11 by way of public communication network 31. In addition, storage battery controller 54 acquires the outside air temperature that is the index value from air thermometer 51.

Storage battery controller 54 adjusts the charging/discharging amount of storage battery 52 based on the outside air temperature and demand response signals. More specifically, storage battery controller 54 causes storage battery 52 to charge during time periods other than reduced use periods indicated by demand response signals and causes the storage battery to discharge by a discharge amount that accords with the outside air temperature during a reduced use period. Based on the outside air temperature, storage battery controller 54 at such times raises the amount of discharging based on the higher demand for electric power that can be anticipated according to the outside air temperature. Storage battery controller 54 may further not only adjust the charging/discharging amount of storage battery 52 based on the demand response signals and outside air temperature but also may adjust the charging/discharging amount of storage battery 52 in accordance with instructions from the consumer.

Figure 3:
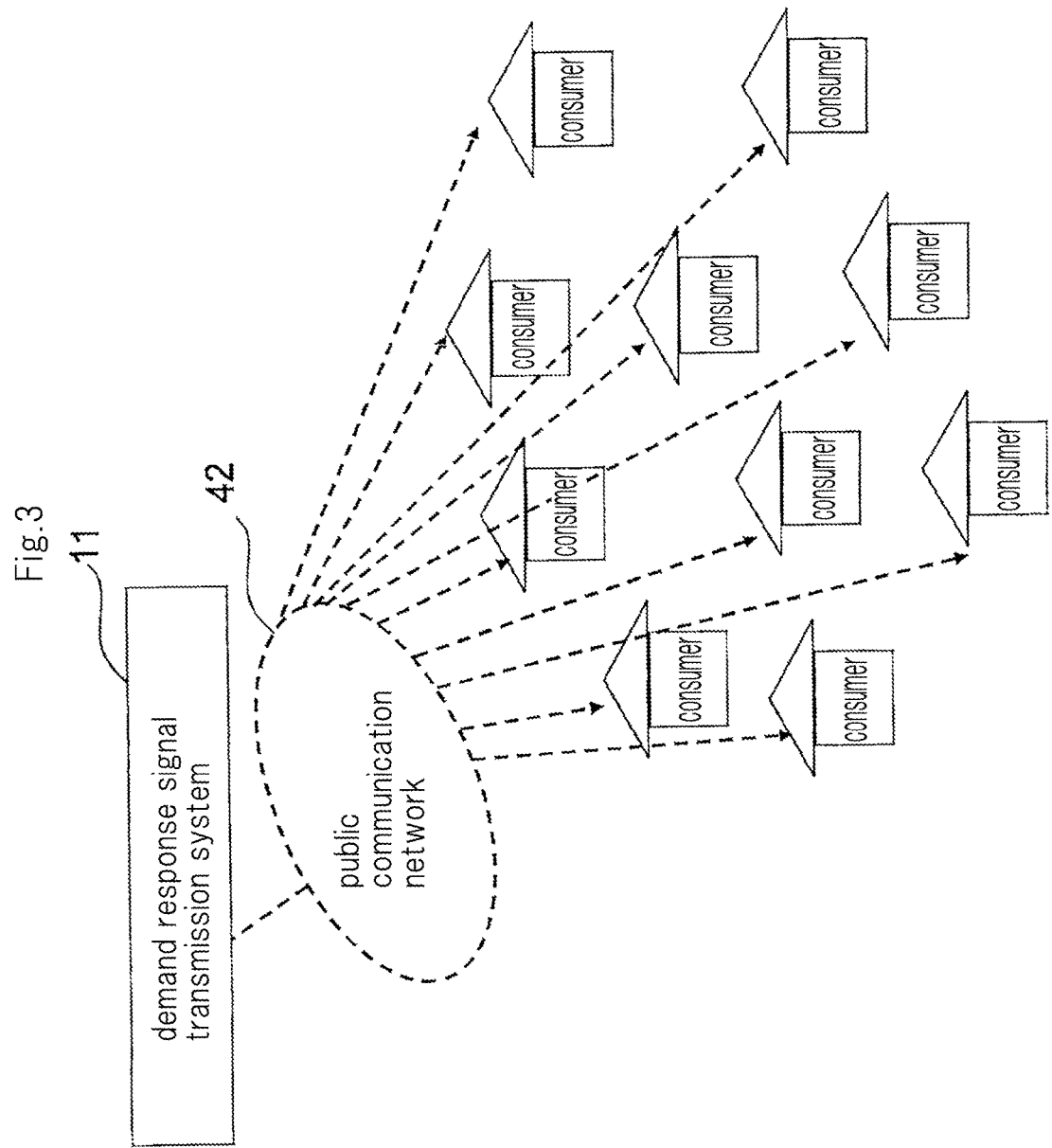
FIG. 3 shows another example of the demand response system of the first exemplary embodiment of the present invention.

Although only one consumer is provided with energy management system 21 in the configuration of the present exemplary embodiment as described hereinabove, there may also be a plurality of consumers as shown in FIG. 3. In this case, demand response signal transmission system 11 transmits demand response signals to each of energy management systems 21 that are provided in each of the consumer households.

The operation of the demand response system of the present exemplary embodiment is next described.

Demand response signal transmission system 11 first transmits an electricity price signal, which shows the reduced use periods and the electricity charges, as a demand response signal to energy management system 21 by way of public communication network 31. Demand response signal transmission system 11 is assumed to transmit an electricity price signal at regular intervals (for example, once a day).

Figure 4:
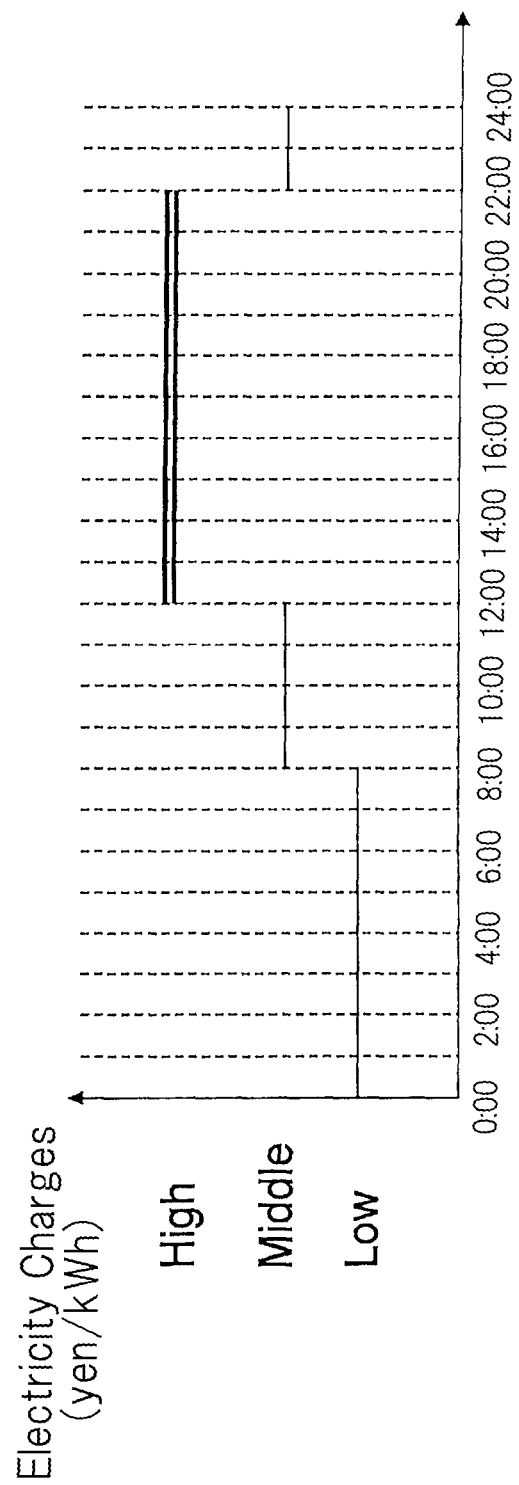
FIG. 4 shows an example of an electricity price signal.

FIG. 4 shows an example of an electricity price signal. As shown in FIG. 4, the electricity price signal indicates the electricity charges for each use period. In the example of FIG. 4, the electricity charges increase in order from (Low) for the use period from 00:00 to 8:00, (Middle) for the time period from 8:00 until 12:00 and 22:00 until 24:00, and (High) for the time period from 12:00 until 22:00. The reduced use period is the time period in which the electricity charges are highest (from 12:00 until 22:00), and the electricity price signal indicates the time period in which the electricity charges are highest as the reduced use period.

No particular limitation applies to the method of indicating the reduced use period by the electricity price signal. For example, when the electricity price signal is indicated by a numerical list (table) of electricity charges, the reduced use period may be indicated using a number that is not used in the electricity charges, such as "zero yen." Alternatively, when the electricity charges are indicated by a character string list (table), the electricity price signal may show the reduced use period by using a character string other than the character strings that indicate the electricity charges.

Returning to the explanation of the operation, having received an electricity price signal from energy management system 21, storage battery controller 54 of energy management system 21 acquires the outside air temperature from air thermometer 51 and then adjusts the charging/discharging amount of storage battery 52 based on the electricity price signal and outside air temperature.

More specifically, storage battery controller 54 causes storage battery 52 to charge for use periods other than the reduced use period that is indicated by the electricity price signal, and during the reduced use period, causes the storage battery to discharge at a discharging amount that accords with the outside air temperature. During the reduced use period, peaks of electric power demand increase in proportion to the rise of peaks of the outside air temperature as shown in FIG. 3, and storage battery controller 54 therefore uses the following Formula (1) to adjust charging/discharging amount P1 of storage battery 52 in proportion to the difference between outside air temperature $T_{out}$ and a reference temperature T0.

[Numerical Expression 1]

$$P1 = -\alpha(T_{OUT} - T0) \quad \text{(Formula 1)}$$

In Formula (1), proportional coefficient α is a positive value parameter. Storage battery 52 is charged when charging/discharging amount P1 is positive, and storage battery 52 is discharged when charging/discharging amount P1 is negative.

Figure 5:
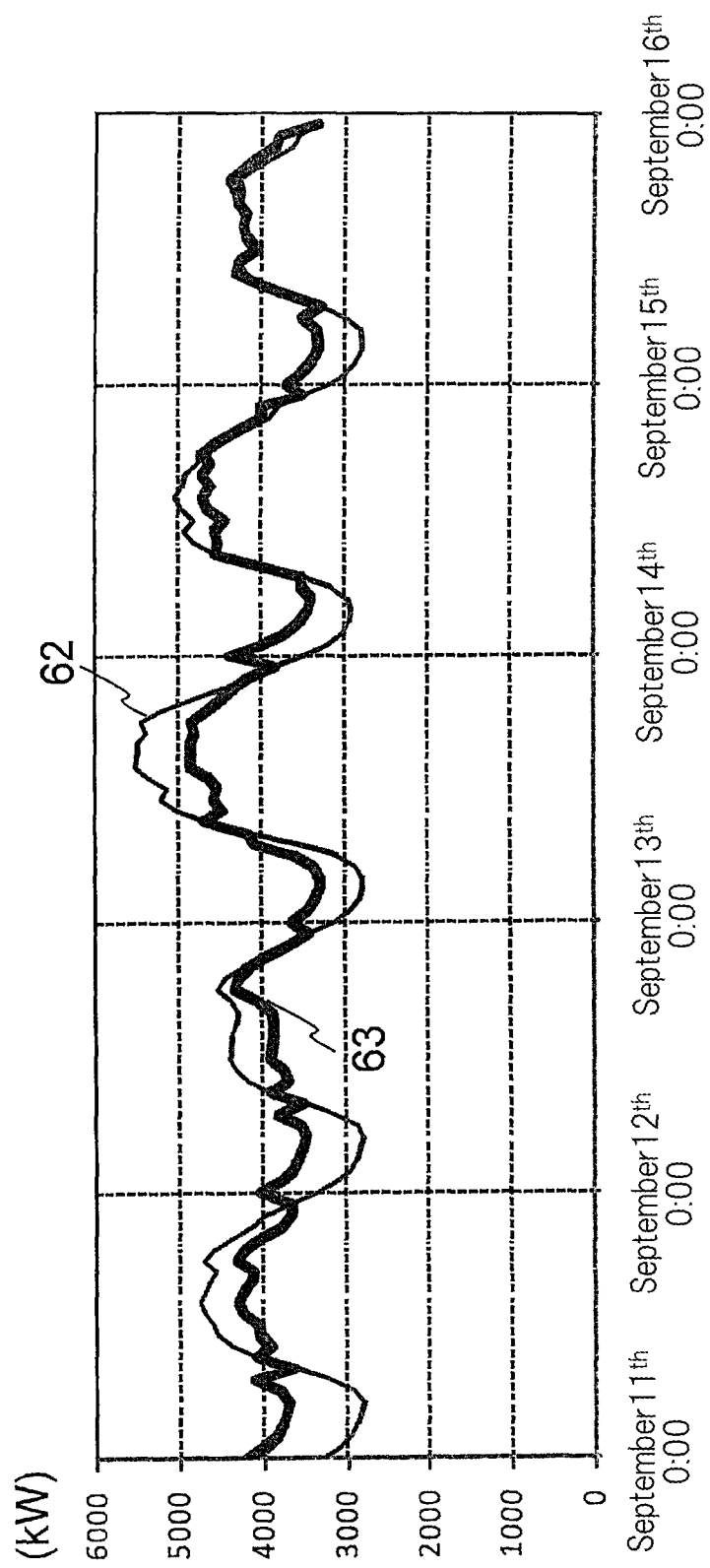
FIG. 5 is a view for describing an example of the effect of the demand response system of the first exemplary embodiment of the present invention.

FIG. 5 is a view for describing the effect of the present exemplary embodiment. In FIG. 5, changes in the outside air temperature are assumed to be represented by temperature curve 62 shown in FIG. 2, and FIG. 5 shows this temperature curve 62 (thin line) and demand curve 63 (thick line) that represents the changes in the demand for electric power when storage battery controller 54 uses Formula (1) to adjust the charging/discharging amount of storage battery 52. Changes in the demand for electric power when storage battery controller 54 does not adjust the charging/discharging amount of storage battery 52 are represented by demand curve 61 shown in FIG. 2.

In FIG. 5, the amount of outside electric power that can be supplied is assumed to be approximately 60,000,000 kW, the capacity of storage battery 52 that is installed in each consumer household is assumed to be on the scale of one ten-millionth of the total amount of external electric power that can be supplied (maximum discharging amount=2 kW, capacity=6 kW), the maximum output, which is the total value of the maximum charging/discharging amount of each storage battery 52, is assumed to be 4800 kW, and the total capacity, which is the total value of the capacity of each storage battery 52, is assumed to be 14400 kWh. Although the outside air temperature actually differs for each consumer, it is here assumed that the outside air temperature indicated by temperature curve 62 was measured in all consumer households. In addition, although storage batteries 52 are actually controlled for each consumer, it is here assumed that the same control is carried out for all storage batteries 52. This case is the same as for the case of a single storage battery having a maximum charging/discharging amount of 4800 kW and a total capacity of 14400 kWh.

Storage battery controller 54 is assumed to receive the electricity price signal shown in FIG. 4, and based on this electricity price signal, is assumed to cause charging of storage battery 52 so as to achieve full charge during use periods other than the reduced use period from 12:00 to 22:00 (more specifically, during use periods in which the electricity charges are cheapest, i.e., from 00:00 to 8:00), and during the reduced use period, is assumed to adjust the charging/discharging amount of storage battery 52 in accordance with Formula (1). At this time, reference temperature T0 and proportional coefficient α were set to T0=25° C. and α=0.025.

Under the circumstances described above, peaks in the demand for electric power are reduced by a moderate amount, as shown in demand curve 63 of FIG. 5, and to this extent, storage battery 52 is charged during the night when electricity charges are low, whereby the bottom of the demand for electric power is raised by a moderate amount and the demand for electric power is reduced overall.

Reference temperature T0 is a room temperature value at which people feel comfortable (generally about 25° C.), and proportional coefficient α is determined according to the proportion of the discharging amount that is the discharging amount actually desired with respect to the maximum output of the storage battery (i.e., the extent to which the demand for electric power is to be reduced). As a result, reference temperature T0 and proportional coefficient α may be determined in advance, but because the above-described proportion may change according to circumstances, it is preferably determined based on the next day's demand curve that is predicted based on a past demand curve, past temperature curve, and the next day's expected temperature. In addition, the reference temperature T0 and proportional coefficient α may be determined in storage battery controller 54 or may be determined in demand response signal transmission system 11. In the latter case, the demand response signal transmission system transmits an electricity price signal that further indicates the reference temperature T0 and proportional coefficient α that were determined, and storage battery controller 54 acquires the reference temperature T0 and proportional coefficient α from the electricity price signal.

The operation in summer was described as an example in the above operation, but in the winter, the peaks in the outside air temperature and peaks in demand for electric power have a correlation that differs from that of summer (the lower the outside air temperature, the higher the demand for electric power). In this case, storage battery controller 54 uses a formula in which the symbol preceding the proportional coefficient of Formula (1) is changed to positive to adjust the charging/discharging amount of storage battery 52.

In addition, storage battery controller 54 acquired, as the index value, the outside air temperature that was actually measured by air thermometer 51, but storage battery controller 54 may acquire the outside air temperature by a different method.

For example, the electricity price signal that is the demand response signal may further indicate the outside air temperature in the reduced use period, and storage battery controller 54 may acquire the outside air temperature from the received electricity price signal. The outside air temperature that is indicated by the electricity price signal is, for example, the predicted temperature of the region where the consumer is located.

Figure 6:
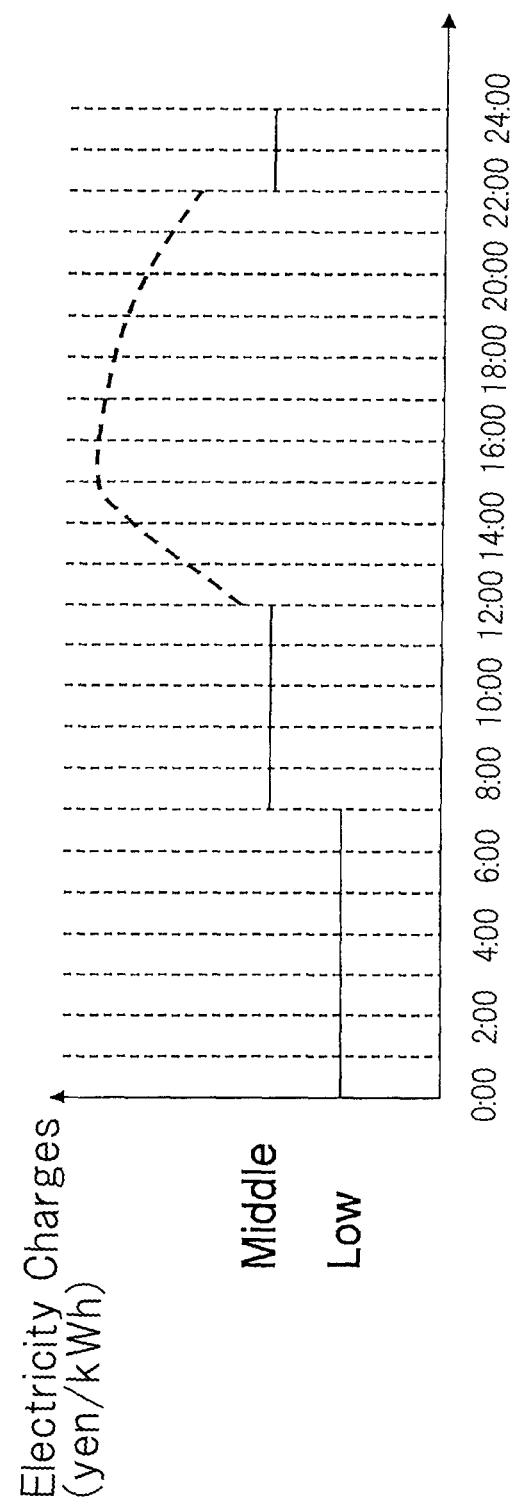
FIG. 6 shows an example of a demand response signal that indicates outside air temperature.

FIG. 6 shows an example of the electricity price signal that indicates the temperature. In FIG. 6, the electricity charges in the reduced use period change according to the outside air temperature, and the electricity price signal uses the electricity charges to indicate the outside air temperature. In this case, storage battery controller 54 holds a table that indicates the relation between the electricity charges and the outside air temperature or formula information that indicates a formula for matching the electricity charges to an outside air temperature and then acquires the outside air temperature by using the table or the formula information that it holds to match the electricity charges indicated by the electricity price signal in the reduced use period to the outside air temperature. The electricity charges may also be charged according to the outside air temperature in time periods other than the reduced use period.

According to the present exemplary embodiment as described hereinabove, the charging/discharging amount of storage battery 52 is adjusted based on a demand response signal that indicates the reduced use period and the outside air temperature that is an index value having a correlation with the demand for electric power, and as a result, sudden increases in the charging/discharging amount at the starting time of a reduced use period can be mitigated while also lowering the demand for electric power in the reduced use period. As a result, the balance between the supply and demand of outside electric power can be improved.

In the present exemplary embodiment, storage battery 52 undergoes charging in time periods other than the reduced use period, and storage battery 52 discharges at a discharging amount that is based on the outside air temperature in the reduced use period. As a result, the present exemplary embodiment can prevent sudden increase in the charging/discharging amount at the starting time of a reduced use period while both stimulating the demand for electric power in time periods other than the reduced use period, these being time periods in which the demand for electric power is low, and further, can lower the demand for electric power in the reduced use period. As a result, the balance between the supply and demand for outside electric power can be improved.

In the present exemplary embodiment, the discharging amount increases by the degree of increase in the demand for electric power that is expected according to the outside air temperature in a reduced use period, and as a result, the balance between supply and demand of outside electric power can be further improved.

In the present exemplary embodiment, the outside air temperature is acquired from air thermometer 51 or from a demand response signal. An index value of high accuracy can be obtained when the outside air temperature is acquired from air thermometer 51, but when the outside air temperature is acquired from the demand response signal, air thermometer 51 need not be provided and a reduction of costs can be achieved.

The second exemplary embodiment is next described.

In the first exemplary embodiment, the outside air temperature was used as the index value for adjusting the charging/discharging amount of storage battery 52, but the index value is not limited to the outside air temperature and another value may be used as long as it is a value that correlates with the demand for electric power. The index value may also differ according to the time of year or a time period. For example, the amount of solar irradiation may be used as the index value for daytime during the winter. Alternatively, the human inclination to use electric power, if it can be quantified, may also be used as the index value.

An example in which the consumption amount that is consumed in a predetermined electrical apparatus is used as the index value described in the present exemplary embodiment. No particular limitation applies to the predetermined electrical apparatus as long as the amount of electric power consumption is correlated with the demand for electric power, but in the present exemplary embodiment, an air conditioner was taken as the predetermined electrical apparatus.

An air conditioner is provided with a heat source and controls the quantity of output heat of this heat source such that the indoor temperature becomes a set value. For example, during summer, if the indoor temperature is higher than the set value, the air conditioner consumes electric power to drive the heat source and send cool air indoors. The higher the outside air temperature at this time, the greater is the heat that is dispersed from outdoors to indoors to cause the indoor temperature to rise, and as a result, the higher the outdoor temperature, the higher is the capability of the heat source that must be set to make the indoor temperature the set temperature. Accordingly, the higher the outdoor temperature, the higher the amount of electric power consumption of the air conditioner, and there is consequently a positive correlation between the outdoor temperature and the amount of electric power consumed by the air conditioner. As a result, there is a positive correlation between the demand for electric power and the amount of electric power consumed by an air conditioner, and the amount of electric power consumed by air conditioner can therefore be used as the index value.

In following explanation, a heat balance model for a house with a single room is used for the sake of simplicity, and a more specific explanation is presented regarding the correlation between the amount of electric power consumed by an air conditioner and the demand for electric power.

The above-described heat balance model can be represented by the following Formula (2), which is a differential equation. This heat balance model is described in Miyanaga, et al., "Development of a practical design tool for indoor thermal environments Part 1: Method for calculating the heat load and thermal comfort index of multiple rooms considering the thermal interaction," Central Research Institute of Electric Power Industry, Report R06016 of the Central Research Institute of Electric Power Industry, p. 3. (http://www.criepi.denken.or.jp/jp/kenkikaku/report/detail/R06016.html)

[Numerical Expression 2]

$$C_D \frac{\partial T_r}{\partial t} = (T_r - T_{out})\frac{A}{R} + Q \qquad \text{(Formula 2)}$$

In Formula 2, $C_D$ is the sensible heat capacity of indoor air, A is the area of a building, R is the thermal resistance of the building, $T_r$ is the room temperature in the building, $T_{out}$ is the outdoor temperature, and Q is the quantity of output heat of the heat source of an air conditioner.

The time response of the quantity of output heat Q is found from Formula (2) by using a method such as PID (Proportional-Integral-Derivative) control to calculate the output heat quantity Q such that the room temperature $T_r$ becomes a set value. If the air conditioner is assumed to be a heat-exchange air conditioner, the value obtained by dividing the quantity of exchanged heat that is the output heat quantity Q of the heat source by the COP (Coefficient of Performance) value is found as the amount of electric power consumption PAC of the air conditioner.

Figure 7:
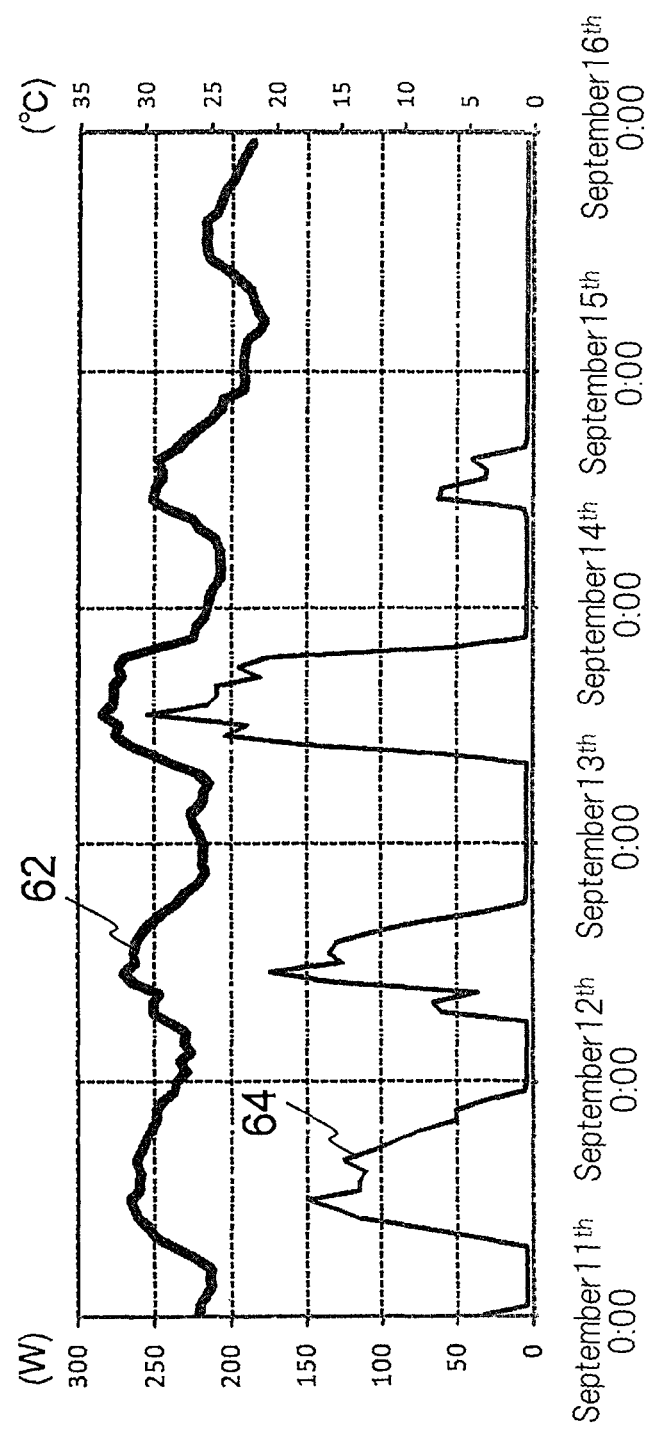
FIG. 7 shows the relation between electric power consumption of an air conditioner and the outside air temperature.

FIG. 7 shows the relation between the outdoor temperature and the amount of electric power consumption of the air conditioner in the above-described heat balance model. FIG. 7 assumes the change in the outdoor air temperature that is represented by air temperature curve 62 of FIG. 2 and shows this air temperature curve 62 (thick line) and energy consumption curve 64 (thin line) that represents the change in the amount of electric power consumed by the air conditioner. In addition, A/R=150 W/K, $C_D$=90×10³ J/K, and the set value of the room temperature is 28° C.

As shown in FIG. 7, when the outdoor air temperature surpasses 28° C. that is the set value, the air conditioner uses electric power to produce cold air, and the power consumed by air conditioner therefore increases. Accordingly, the higher the outdoor air temperature, the higher the amount of electric power that is consumed by the air conditioner.

Figure 8:
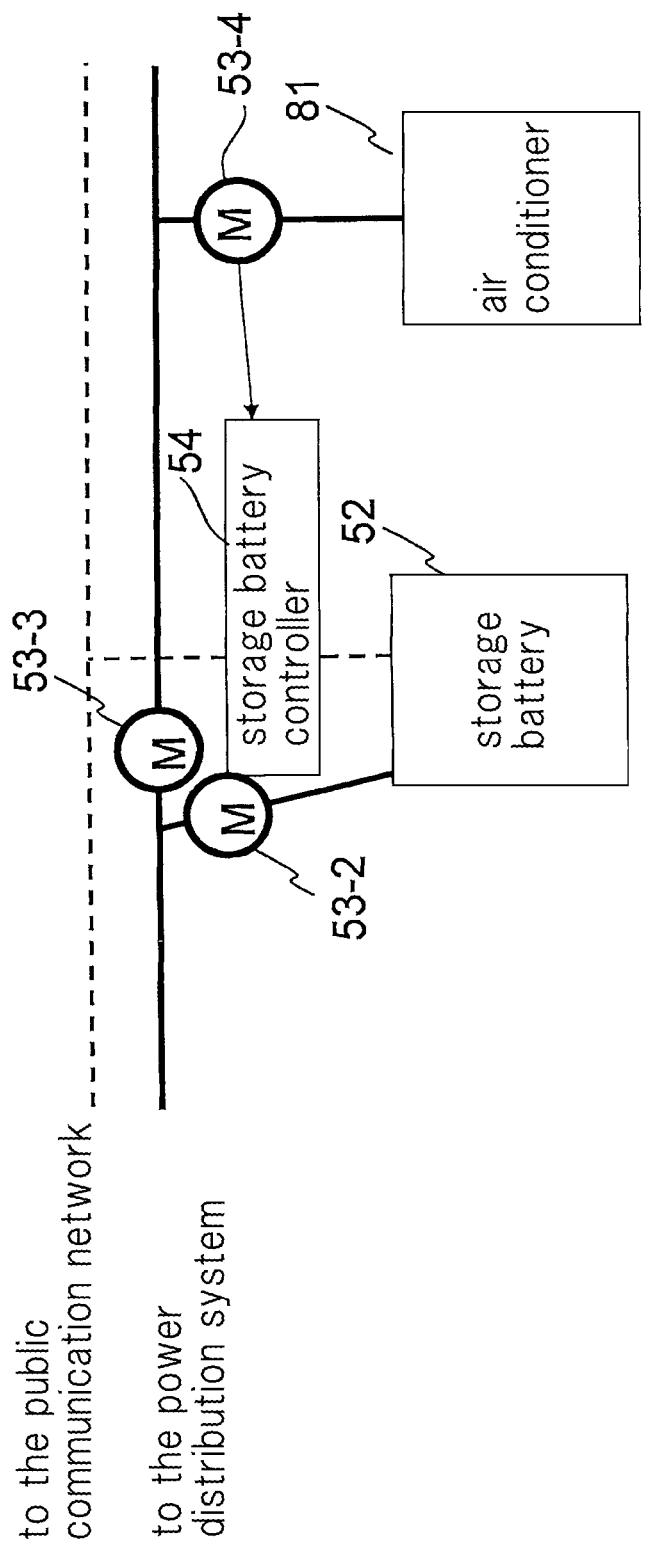
FIG. 8 shows an example of the energy management system of the second exemplary embodiment of the present invention.

FIG. 8 shows the energy management system of the present exemplary embodiment. In FIG. 8, air conditioner 81 is installed in a consumer residence as consumer apparatus 43 of FIG. 1, and the energy management system differs from energy management system 21 shown in FIG. 1 in that air thermometer 51 is omitted and watt-hour meter 53-4, which is a measurement device that measures the amount of power consumed by air conditioner 81 as the index value, is included as watt-hour meter 53.

Storage battery controller 54 receives an electricity price signal and acquires the amount of power consumed by air conditioner from watt-hour meter 53-4. Storage battery controller 54 then adjusts the charging/discharging amount of storage battery 52 based on the electricity price signal and the amount of power consumption.

For example, storage battery controller 54 receives the electricity price signal shown in FIG. 4, and based on this electricity price signal, causes charging of storage battery 52 such that storage battery 52 is fully charged in the time period from 00:00 until 8:00 when the electricity charges are lowest, and in the time period from 12:00 until 22:00 that is the reduced use period, adjusts the amount of discharging of storage battery 52 to a value obtained by multiplying the amount of power consumed by air conditioner 81 by proportional coefficient β.

Figure 9:
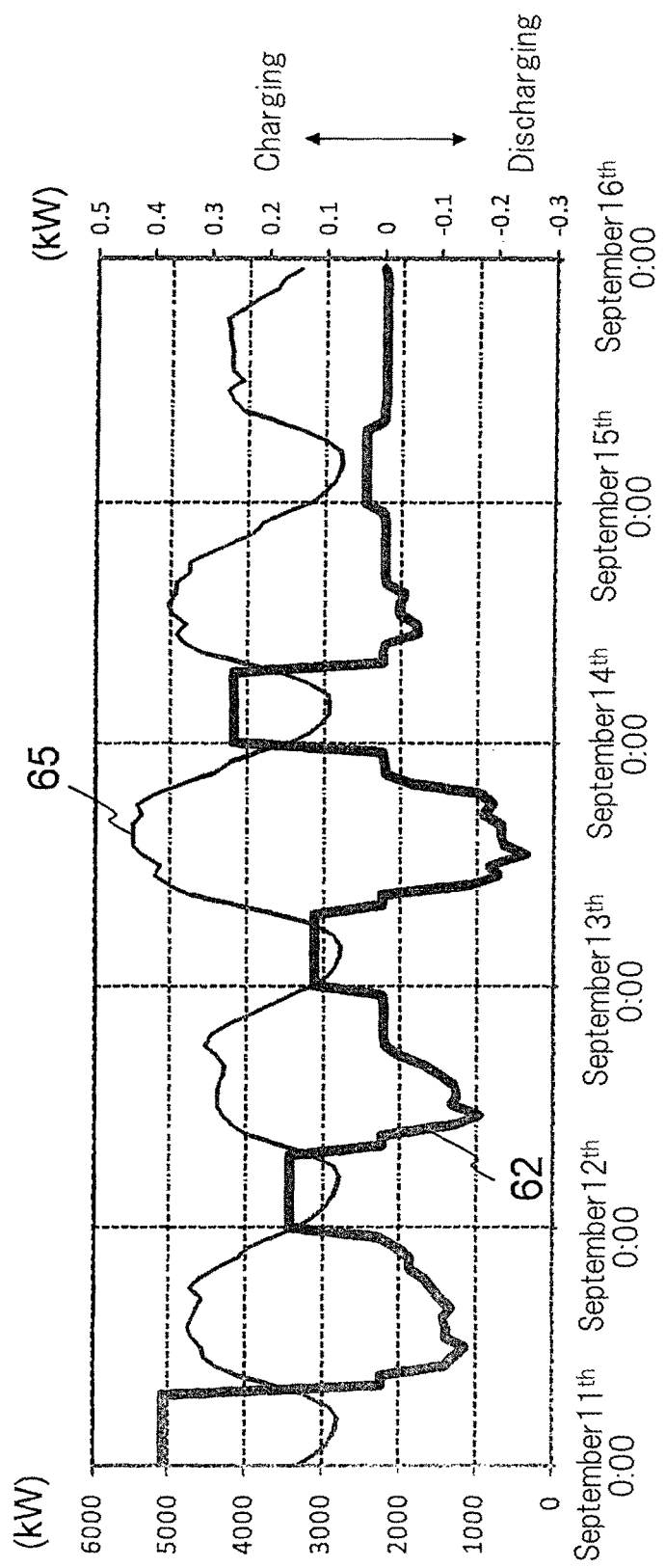
FIG. 9 shows an example of change in the amount of electric power charging/discharging of one storage battery.

FIG. 9 shows the change in the charging/discharging amount of storage battery 52 when the proportional coefficient β is "1." FIG. 9 assumes the change in the outside air temperature that is represented by air temperature curve 62 of FIG. 2 and shows air temperature curve 62 (thick line) and charging/discharging power curve 65 (thin line) that represents the change in the charging/discharging amount of storage battery 52. As shown in FIG. 9, the higher the demand for electric power, the higher the discharging amount of storage battery 52.

Figure 10:
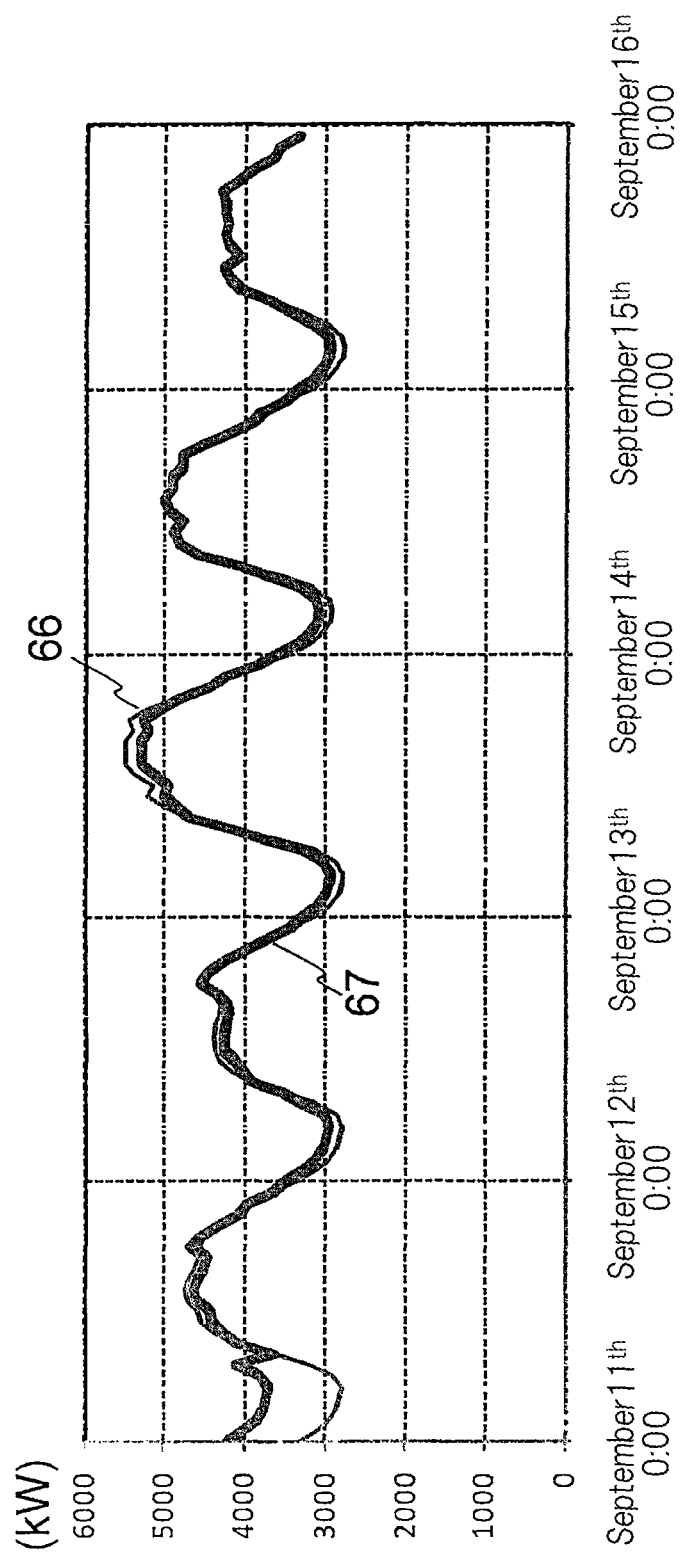
FIG. 10 shows an example of the changes in the sum total of the amount of electric power charging/discharging of storage batteries that are installed in all consumer households.
Figure 11:
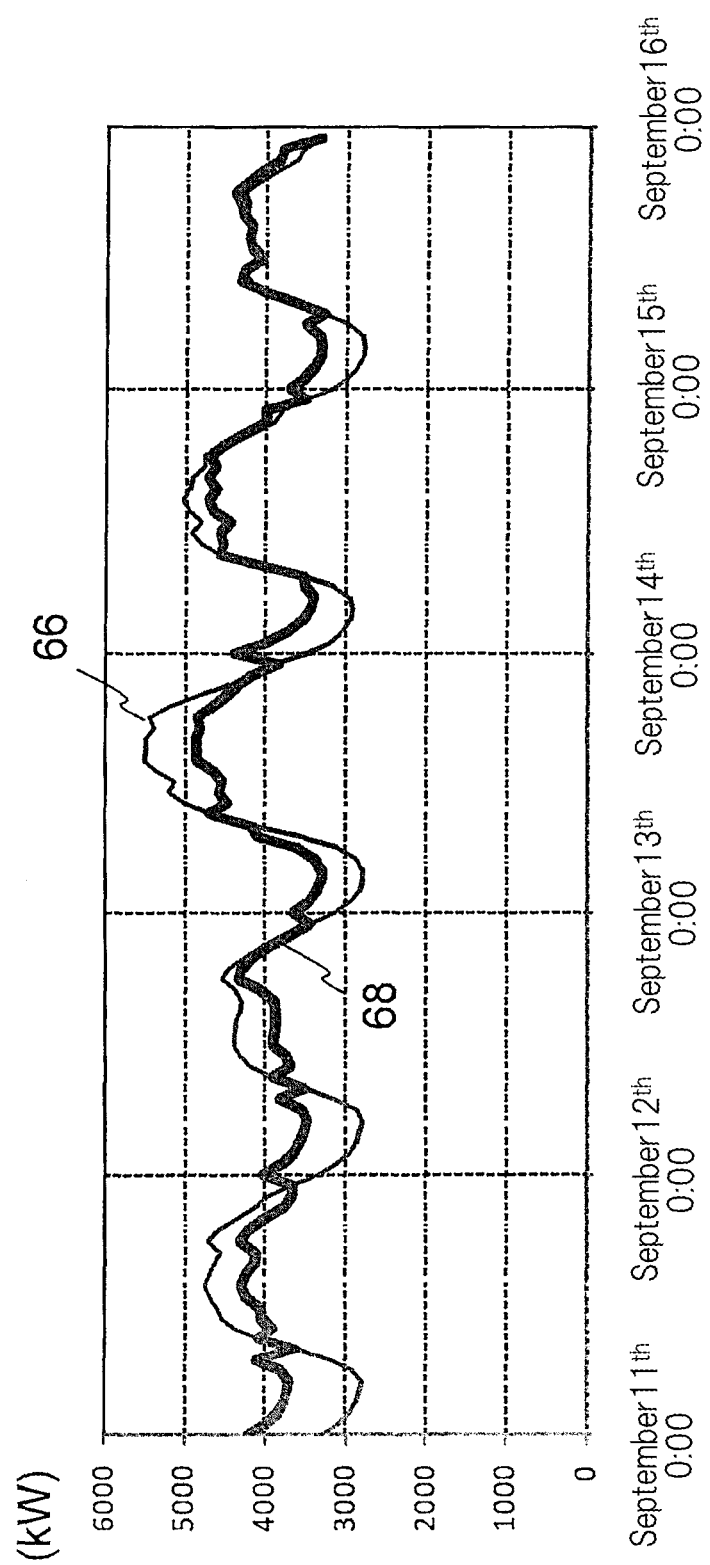
FIG. 11 shows another example of the changes in the sum total of the amount of electric power charging/discharging of storage batteries that are installed in all consumer households.
Figure 12:
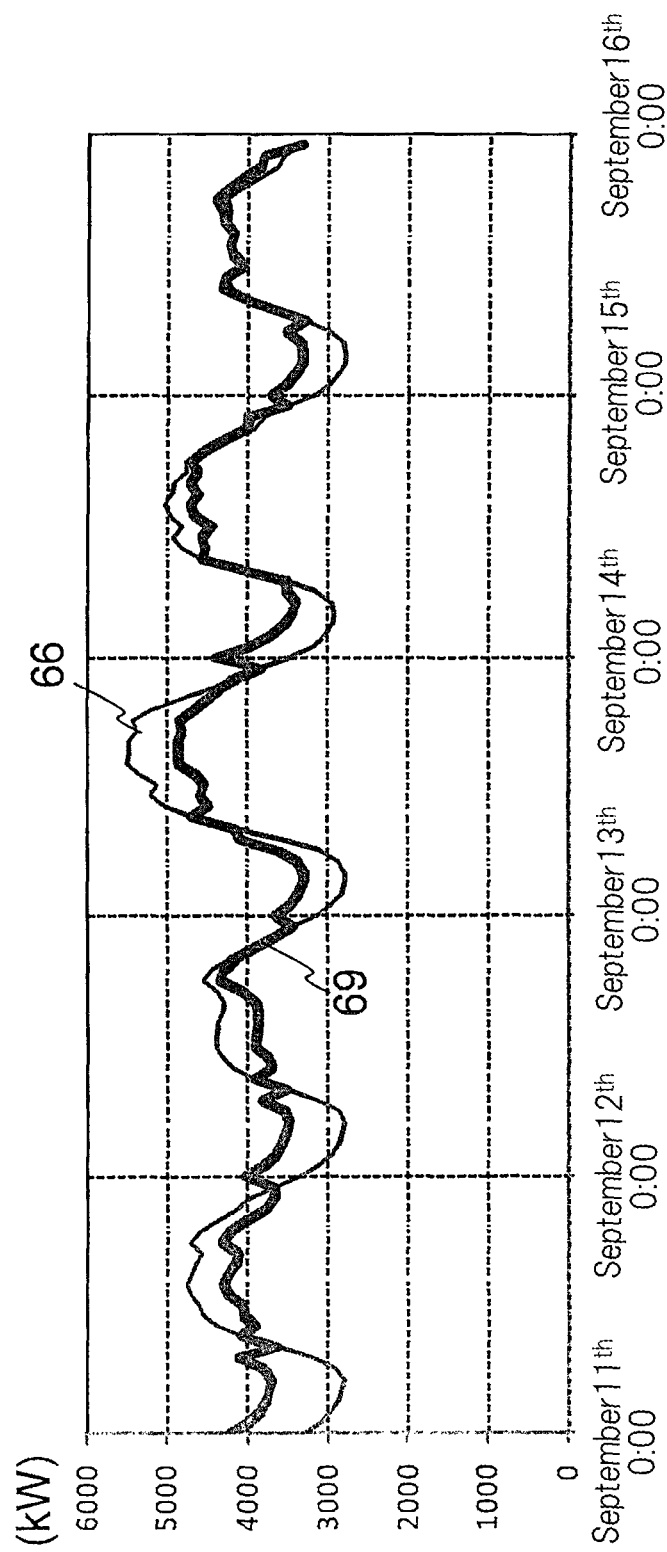
FIG. 12 shows another example of the changes in the sum total of the amount of electric power charging/discharging of storage batteries that are installed in all consumer households.
Figure 13:
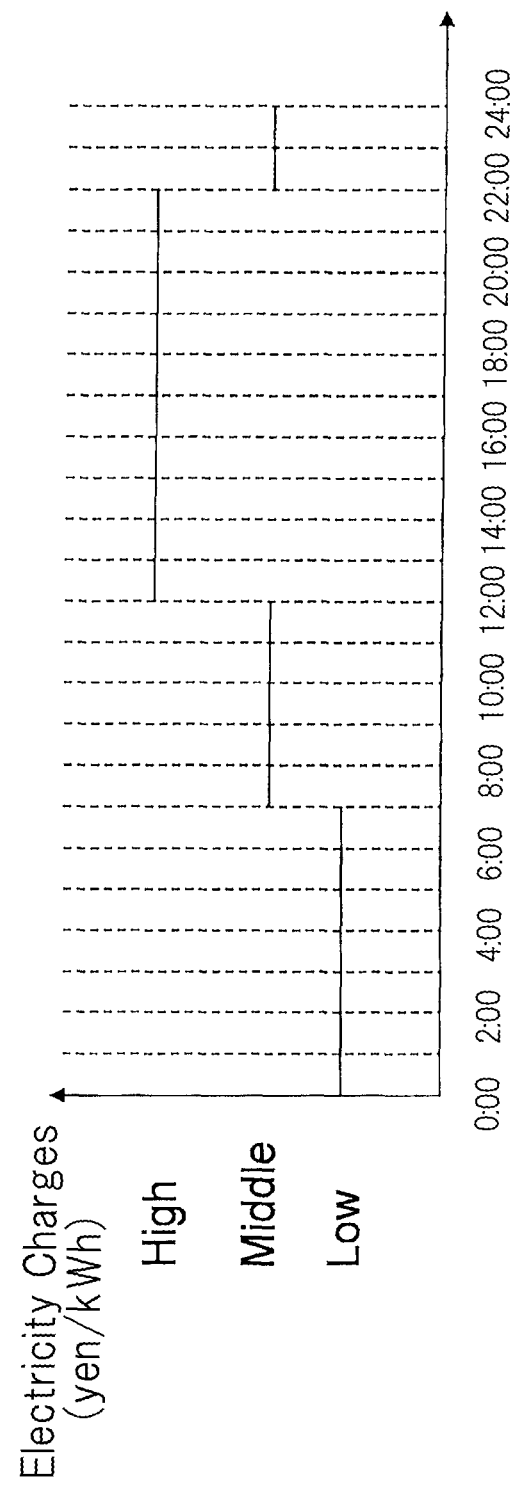
FIG. 13 shows time-of-use electricity charges that take into consideration peak time-of-use charges.
Figure 14:
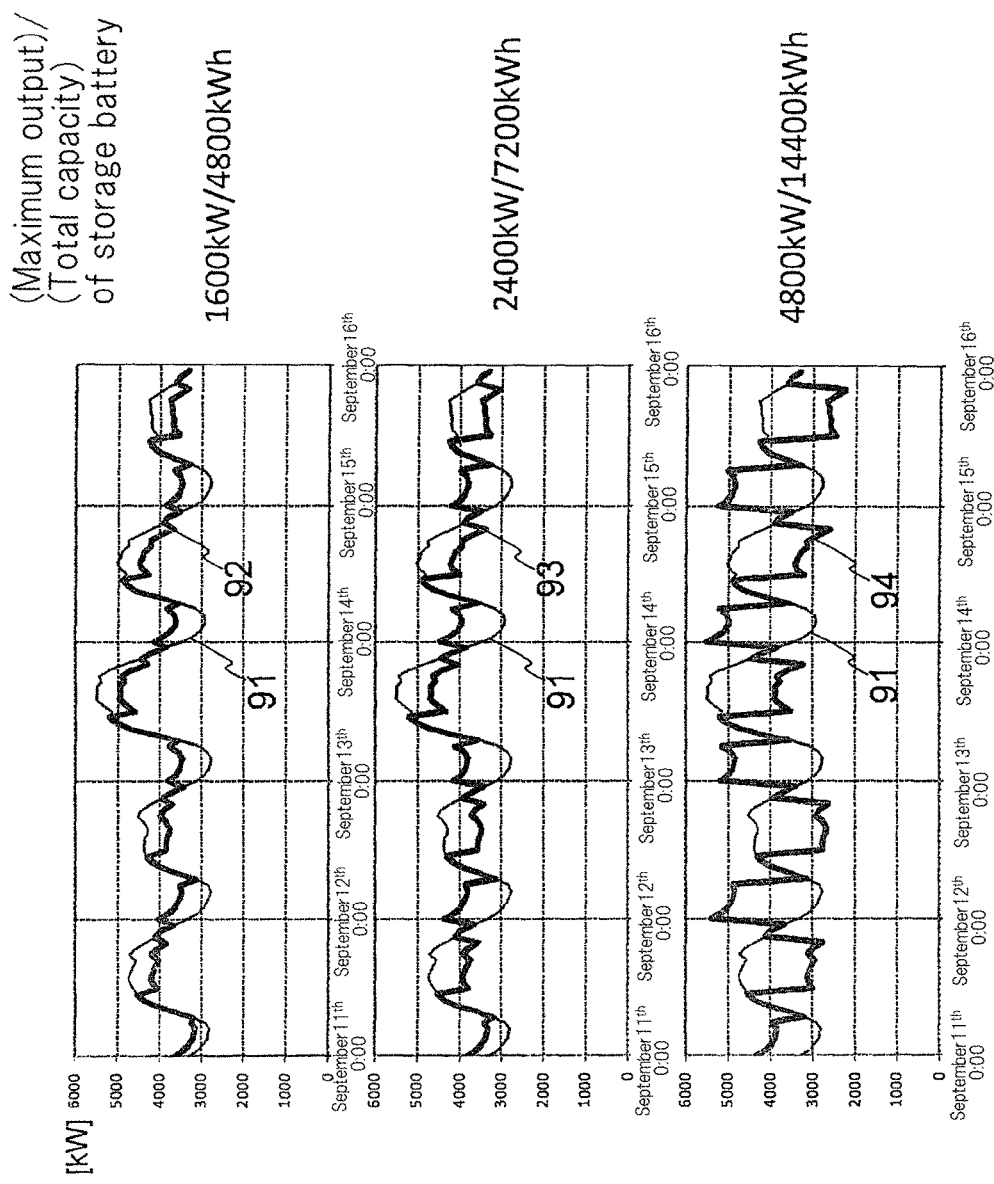
FIG. 14 shows the results of simulations in which change in demand for commercial power is calculated in the related art of the present invention.

FIGS. 10-12 show the change in the sum total of the charging/discharging amount of storage batteries 52 that are installed in each consumer household assuming that there are 2400 consumer households, that the same air conditioner 81 is installed in each consumer household, and that the outside air temperature of each consumer household is the same. FIGS. 10-12 show demand curve 66 (thin line) that represents the change in the demand for electric power when storage battery controller 54 does not adjust the charging/discharging amount of storage batteries 52 and demand curves 67-69 (thick lines) that represent the change in the demand for electric power when storage battery controller 54 adjusts the charging/discharging amount of storage batteries 52. The maximum output, which is the total value of the maximum charging/discharging amount of each of storage batteries 52, is assumed to be 4800 kW, and the total capacity, which is the total value of the capacity of each of storage batteries 52, is 14400 kWh. Demand curve 67 of FIG. 10 represents the change of the demand for electric power when proportion coefficient β is 10/24, demand curve 68 of FIG. 11 represents the change of demand for electric power when proportional coefficient β is 30/24, and demand curve 69 of FIG. 12 represents the change of demand for electric power when the proportional coefficient δ is 50/24.

As shown in FIGS. 10-12, the demand for electric power can be adjusted to an average level if the proportional coefficient is set to the appropriate range.

In FIGS. 10-12, although the same air conditioner 81 is assumed to be present in each consumer household and storage battery controller 54 is assumed to carry out the same operation at the same outside air temperature, in actuality, when the discharging amount of each storage battery 52 of each consumer household is individually adjusted by discharging storage batteries 52 at a discharging amount that is the same as the amount of power consumption of air conditioner 81 in each consumer household, i.e., by making proportional coefficient δ=1, extreme discharges of storage batteries 52 do not occur and the demand for electric power can therefore be relatively gradually reduced.

In addition, although storage battery controller 54 acquired, as the index value, the amount of power consumption that was actually measured by watt-hour meter 53-4, storage battery controller 54 may also acquire the amount of power consumption by a different method.

As a different method, an example can be offered in which the electricity price signal further indicates the amount of power consumption in the reduced use period, and storage battery controller 54 acquires the amount of power consumption from the received electricity price signal.

For example, when the electricity charges in the reduced use period change according to the amount of power consumption and, as in the electricity price signal shown in FIG. 6, the electricity price signal uses the electricity charges to indicate the amount of power consumption, storage battery controller 54 uses, for example, a table that shows the relation between the electricity charges and the amount of power consumption to acquire the amount of power consumption from the electricity price signal.

The amount of power consumption shown by the electricity price signal can be found by, for example, demand response signal transmission system 11 acquiring the measured value of the amount of power consumption of air conditioner 81 of one or a plurality of representative consumer households from among the consumer households that have air conditioners 81 and then multiplying the measured value or the average of the measured values by β.

In each of the exemplary embodiments described hereinabove, the electricity charges indicated by the electricity price signal do not take into consideration the electricity charges of the electric power that is sold to an electric power company during a reduced use period. As a result, after the completion of a reduced use period, accounts may be separately cleared such that the amounts of money that accord with the electric power purchased by the electric power company are fairly distributed to each consumer.

As in the first exemplary embodiment, according to the present exemplary embodiment as described hereinabove, the amount of charging/discharging of storage battery 52 is adjusted based on an electricity price signal that indicates the reduced use period and an amount of power consumed by an electrical apparatus that serves as an index value that correlates with the demand for electric power, and as a result, sudden increases in the amount of charging/discharging at the starting time of a reduced use period can be prevented while the demand for electric power can be reduced in the reduced use period. The present exemplary embodiment can therefore improve the balance between supply and demand of outside electric power.

In each of the exemplary embodiments described hereinabove, the configurations shown in the figures are merely examples, and the present invention is not limited to these configurations.

This application claims the benefits of priority based on Japanese Patent Application No. 2013-041665 for which application was submitted on Mar. 4, 2013 and incorporates by citation all of the disclosures of that application.

EXPLANATION OF REFERENCE NUMBERS

11 demand response signal transmission system
21 energy management system
31 public communication network
41 power plant
42 power line
43 consumer apparatus
51 air thermometer
52 storage battery
53-1-53-4 watt-hour meter
54 storage battery controller
61, 63, 66-69 demand curve
62 air temperature curve
64 energy consumption curve
65 charging/discharging power curve
81 air conditioner

What is claimed is:

1. An energy management system comprising:
   a storage battery that is connected to a power line that transmits outside electric power; and
   a control unit that receives a control signal that indicates reduced use periods in which the amount of consumption of said outside electric power by a load that is connected to said power line is reduced, further, acquires an index value that has a correlation with the demand for said outside electric power, and adjusts an amount of charging/discharging that is to be charged or discharged in said storage battery on the basis of said control signal and said index value.

2. The energy management system as set forth in claim 1, wherein:
   said control unit causes said storage battery to charge during use periods other than said reduced use periods and causes said storage battery to discharge at a discharging amount that is based on said index value during said reduced use periods.

3. The energy management system as set forth in claim 2, wherein:
   said control unit increases said discharging amount according to the degree that said demand increases based on said index value during said reduced use periods.

4. The energy management system as set forth in claim 1, wherein:
   said control unit acquires, as said index value, outside air temperature or an amount of power consumption that is consumed in a prescribed electrical apparatus.

5. The energy management system as set forth in claim 4, wherein said prescribed electrical apparatus is an air conditioner.

6. The energy management system as set forth in claim 1, further comprising:
   a measurement device that measures said index value; wherein said control unit acquires said index value from said measurement device.

7. The energy management system as set forth in claim 1, wherein:
   said control signal further indicates said index value in said reduced use periods; and
   said control unit acquires said index value from said control signal.

8. The energy management system as set forth in claim 7, wherein:
   said control signal uses electricity charges that change according to said index value to indicate said index value.

9. An energy management method comprising steps of:
   receiving a control signal that indicates reduced use periods in which the amount of consumption of an outside electric power by a load that is connected to a power line that transmits said outside electric power is reduced;
   acquiring an index value that has a correlation with demand for said outside electric power; and
   on the basis of said control signal and said index value, adjusting the amount of charging/discharging that is to be charged or discharged in a storage battery that is connected to said power line.

* * * * *